J. L. CHESNUTT.
SWIVEL CASTER.
APPLICATION FILED JUNE 15, 1918.
1,296,764.
Patented Mar. 11, 1919.
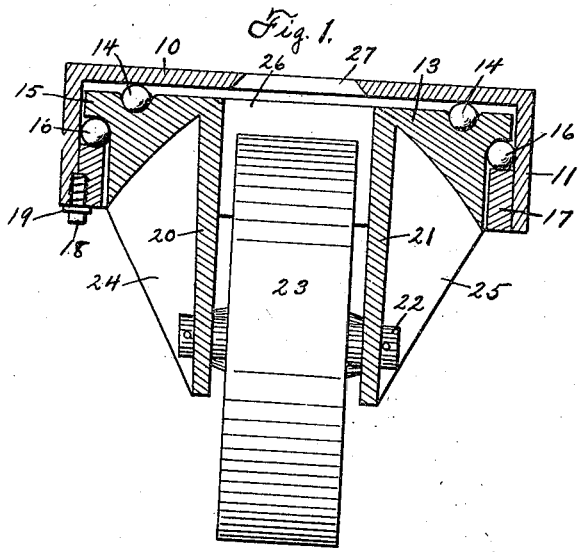
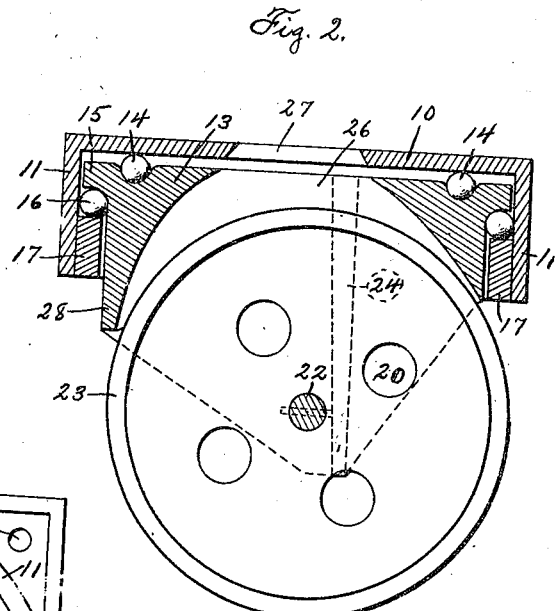
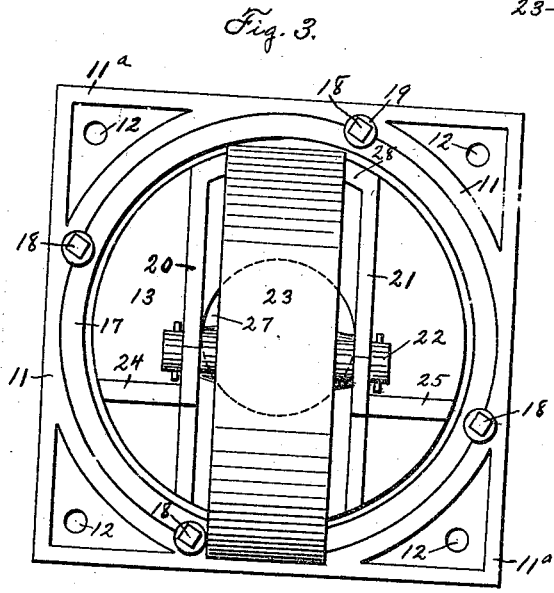
INVENTOR:
J. L. CHESNUTT
By Earl M. Sinclair
Atty.

UNITED STATES PATENT OFFICE.

JOHN LOUCIEN CHESNUTT, OF KANSAS CITY, MISSOURI.

SWIVEL-CASTER.

1,296,764.  Specification of Letters Patent.  Patented Mar. 11, 1919.

Application filed June 15, 1918. Serial No. 240,205.

*To all whom it may concern:*

Be it known that I, JOHN LOUCIEN CHESNUTT, a citizen of the United States of America, and resident of Kansas City, Jackson county, Missouri, have invented a new and useful Swivel-Caster, of which the following is a specification.

The object of this invention is to provide an improved construction for a ball-bearing swivel caster.

A further object of this invention is to increase the diameter of the wheel relative to the total height of the caster.

A further object of this invention is to facilitate swiveling by preventing binding and friction between contacting surfaces of the wheel-bearing part and the load-attaching member.

A further object of this invention is to facilitate assembling of the parts of the caster.

My invention consists in the construction, arrangement and combination of elements hereinafter set forth, pointed out in my claims and illustrated by the accompanying drawings, in which—

Figures 1 and 2 are vertical sections, at right angles to one another, illustrating my improved caster, the wheel being shown in full lines. Fig. 3 is a bottom plan of the caster.

In the construction of the device as shown an outer or load-bearing frame is employed, comprising a horizontally arranged plate 10, formed with an annular depending flange 11, preferably integral with said plate and of a diameter corresponding to the transverse dimension of said plate, which is square in plan. Corner portions of the plate 10 may be strengthened by extensions 11ª of the flange 10 and be cored out and formed with apertures 12 by means of which the caster may be attached to a device to be carried thereby.

An inner or wheel-bearing frame is also employed and comprises a body portion 13 circular in plan and fitting loosely within the annular flange 11 of the outer frame. The inner frame 13 is formed with an annular groove in its upper surface in which are mounted a plurality of bearing balls 14, which balls contact with the lower surface of the top plate 10. The inner frame 13 also is formed with a horizontal peripheral flange 15 at its top, and the lower surface of said flange is formed on an arc to provide a portion of a ball race for a set of bearing balls 16. A ring 17 is fitted snugly within the depending annular flange 11 and provides a support for the bearing balls 16, said ring being spaced at its inner side sufficiently from the outer surface of the inner frame to prevent frictional contact therewith. Any suitable means may be provided for securing the ring 17 within the annular flange 11, such as a number of machine screws 18 seated from below partially in said ring and partially in the flange, the heads of said screws, together with interposed washers 19 if desired, contacting with the flush lower margins of said ring and flange. The inner frame 13 is formed with spaced parallel depending integral wings 20, 21, and an axle 22 is mounted horizontally through the lower portions of said wings and carries a wheel 23. The axle 22 and wheel 23 preferably are located and arranged rearwardly of the longitudinal center of the inner frame in order to induce swiveling of the inner frame relative to the load in use. Strengthening ribs or flanges 24, 25 preferably are formed vertically on the outer faces of the wings 20, 21 and may taper as desired.

The inner frame 13 may be formed with a centrally located hole 26 in its top and communicating with the wheel space between the wings 20, 21, to permit the use of a wheel of maximum diameter. I have found it desirable to use a wheel of as large diameter as the size of the frame will permit, as it runs more easily and is less influenced by obstructions or roughness in the floor surface. The top plate 10 also may be formed with a central hole 27 to prevent frictional contact by the wheel when a large wheel is employed.

Setting of the wheel 23 to the rear of the center of the frame permits a reinforcing flange 28 to be formed across the front of the inner frame 13, between and connecting the upper portions of the wings 20, 21.

The ring 17, it will be observed, forms the connecting means between the inner and outer frames, by preventing downward movement of the horizontal flange 15 of the inner frame and the interposed balls 16. The device is readily assembled by the insertion of this ring and securing it in place.

The caster constructed as shown and described eliminates the use of the center rivet commonly used in devices of this kind, and obviates the disadvantages due to binding found in the use of such connecting means.

I claim as my invention—

1. A swivel caster, comprising an outer frame formed of a top plate and an annular depending flange thereon, an inner frame mounted loosely within said annular flange, a wheel mounted for rotation in said inner frame, said inner frame being formed with a peripheral horizontal flange, anti-friction devices mounted between the inner frame and the top plate of the outer frame, a ring removably secured within the annular flange of the outer frame, and anti-friction devices mounted between said ring and the horizontal flange of the inner frame.

2. A swivel caster, comprising an outer load-bearing frame including a top plate and an annular depending flange thereon, an inner frame mounted loosely and for rotary movement within said depending flange, a wheel mounted for rotation in and adapted to support said inner frame, said inner frame being formed with an annular groove in its upper surface, bearing balls mounted in said annular groove and contacting the lower surface of said top plate, said inner frame being formed with a peripheral horizontal flange, a ring separately formed and mounted within the annular flange of the top frame and detachably secured thereto, a clearance being provided between said ring and the adjacent surface of the inner frame, and bearing balls mounted between said ring and the horizontal flange of the inner frame.

3. A swivel caster, comprising an outer load-bearing frame including a top plate and an annular depending flange thereon, means for attaching said top plate to a load, an inner frame loosely mounted for rotary movement within the annular flange of the top frame, anti-friction devices mounted between said inner frame and the lower surface of said top plate, a wheel mounted for rotation in said inner frame, said inner frame being formed with a horizontal peripheral flange, a ring tightly mounted within but detachable from the annular flange of the outer frame and spaced from the inner frame, bearing balls mounted between said ring and the horizontal flange of the inner frame, and connecting means for retaining said ring within said annular flange.

4. A swivel caster, comprising an outer frame, means for securing said outer frame to a load, said outer frame including a removable inwardly projecting member at its base, an inner frame within said outer frame and formed with an outwardly projecting horizontal flange above the removable member of the outer frame, a wheel journaled in said inner member, and bearing balls between said horizontal flange and the removable member of the outer frame.

Signed at Kansas City, in the county of Jackson and State of Missouri, this 28" day of May, 1918.

JOHN LOUCIEN CHESNUTT.